(12) United States Patent
Tamatani et al.

(10) Patent No.: US 9,374,593 B2
(45) Date of Patent: Jun. 21, 2016

(54) DATA DECOMPRESSING DEVICE AND NON-TRANSITORY COMPUTER READABLE MEDIUM FOR DETECTING WHETHER INITIAL PORTION OF COMPRESSED IMAGE DATA CORRESPONDS TO SPECIFIC PATTERN

(71) Applicant: FUJI XEROX CO., LTD., Minato-ku, Tokyo (JP)

(72) Inventors: Mitsuyuki Tamatani, Kanagawa (JP); Kazuo Yamada, Kanagawa (JP); Daisuke Matsumoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/471,715

(22) Filed: Aug. 28, 2014

(65) Prior Publication Data

US 2015/0195553 A1    Jul. 9, 2015

(30) Foreign Application Priority Data

Jan. 9, 2014    (JP) .................................. 2014-002270

(51) Int. Cl.
*G06K 9/36*    (2006.01)
*G06K 9/46*    (2006.01)
*H04N 19/44*    (2014.01)
*H04N 19/91*    (2014.01)

(52) U.S. Cl.
CPC ............... *H04N 19/44* (2014.11); *H04N 19/91* (2014.11)

(58) Field of Classification Search
None
See application file for complete search history.

(56) References Cited

U.S. PATENT DOCUMENTS

| | | | | |
|---|---|---|---|---|
| 5,650,861 A | * | 7/1997 | Nakajima | H04N 19/60 358/462 |
| 2001/0054973 A1 | * | 12/2001 | Kobayashi | H03M 7/425 341/67 |
| 2011/0311151 A1 | * | 12/2011 | Tamatani | H04N 19/176 382/233 |

FOREIGN PATENT DOCUMENTS

| | | |
|---|---|---|
| JP | 2009-3765 A | 1/2009 |
| JP | 2012-5070 A | 1/2012 |

* cited by examiner

*Primary Examiner* — Feng Niu
(74) *Attorney, Agent, or Firm* — Sughrue Mion, PLLC (57) ABSTRACT

A data decompressing device includes an effective code length detector and a determining unit. The detector detects an effective code length of an initial portion of compressed image data to be decompressed, and supplies the detected effective code length to a decompressing unit to decompress data having the effective code length from a head of the image data. The determining unit determines whether or not the initial portion of the image data corresponds to a specific pattern in which a block end code follows a code representing a specific DC difference value, and if having determined that the initial portion of the image data corresponds to the specific pattern, notifies the decompressing unit of the detection of the specific pattern without waiting for the detection of the effective code length, to allow the decompressing unit to output a predetermined decompression result corresponding to the specific DC difference value.

10 Claims, 7 Drawing Sheets

DATA DECOMPRESSING DEVICE AND NON-TRANSITORY COMPUTER READABLE MEDIUM FOR DETECTING WHETHER INITIAL PORTION OF COMPRESSED IMAGE DATA CORRESPONDS TO SPECIFIC PATTERN

CROSS-REFERENCE TO RELATED APPLICATIONS

This application is based on and claims priority under 35 USC 119 from Japanese Patent Application No. 2014-002270 filed Jan. 9, 2014.

BACKGROUND (i) Technical Field

The present invention relates to a data decompressing device and a non-transitory computer readable medium.

(ii) Related Art

Some decompressing devices that decompress image data compressed in accordance with a compression system such as joint photographic experts group (JPEG) attempt to increase the decompression speed in various methods.

SUMMARY

According to an aspect of the invention, there is provided a data decompressing device including an effective code length detector and a determining unit. The effective code length detector detects an effective code length of an initial portion of compressed image data to be decompressed, and supplies the detected effective code length to a decompressing unit to allow the decompressing unit to decompress data having the effective code length from a head of the compressed image data. The determining unit determines whether or not the initial portion of the compressed image data to be decompressed corresponds to a specific pattern in which a code representing a specific direct-current difference value is followed by a block end code. If the determining unit has determined that the initial portion of the compressed image data to be decompressed corresponds to the specific pattern, the determining unit notifies the decompressing unit of the detection of the specific pattern without waiting for the detection of the effective code length by the effective code length detector, to allow the decompressing unit to output a predetermined decompression result corresponding to the specific direct-current difference value.

BRIEF DESCRIPTION OF THE DRAWINGS

An exemplary embodiment of the present invention will be described in detail based on the following figures, wherein.

DETAILED DESCRIPTION

Figure 1:
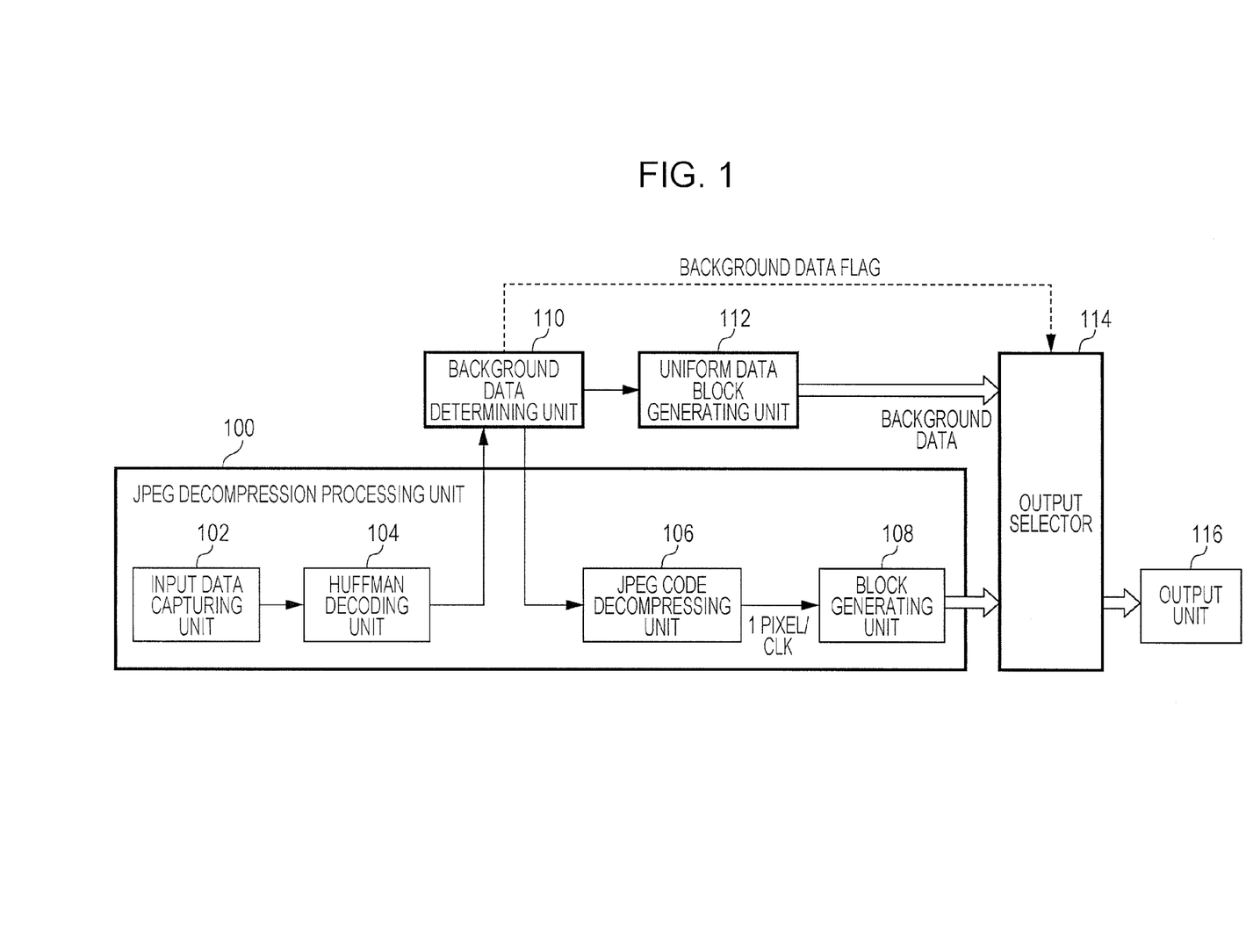
FIG. 1 is a diagram illustrating an example of an image data decoding device to which the mechanism of an exemplary embodiment is applied.

With reference to FIG. 1, description will first be given of a configuration example of an image data decoding device to which the configuration of an exemplary embodiment is applicable. The image data decoding device in FIG. 1 includes a JPEG decompression processing unit 100, a background data determining unit 110, a uniform data block generating unit 112, an output selector 114, and an output unit 116. The JPEG decompression processing unit 100 is a circuit that decompresses JPEG-compressed image data in accordance with the JPEG system. The JPEG decompression processing unit 100 includes an input data capturing unit 102, a Huffman decoding unit 104, a JPEG code decompressing unit 106, and a block generating unit 108. The input data capturing unit 102 is a circuit that receives the JPEG-compressed image data to be decoded.

Roughly speaking, in image compression according to the JPEG system, bitmap image data is divided into blocks each including 8×8 pixels, and each of the blocks is subjected to discrete cosine transform (DCT) to be converted into 8×8 frequency components in the frequency domain, as is well known. Among these frequency components, the component having the lowest frequency (a frequency of 0, for example) is a direct-current (DC) component, which represents the mean of pixel values in the block. The other 63 frequency components higher than the DC component are called alternating-current (AC) components. The frequency components resulting from the DCT are quantized with a quantization table. When the quantized components of one block are aligned in zigzag scan order, resultant data usually starts with the DC component followed by the AC components. This array of components as the quantization result aligned in zigzag scan order is then subjected to Huffman coding to obtain ultimate JPEG-compressed image data. In the Huffman coding process, the DC component (or, in some cases, the difference between the DC component and the DC component of the immediately preceding block) is singly converted into a Huffman code. In the AC components following the DC component, the value 0 frequently appears owing to the quantization, and thus a set of consecutive zeros (called zero-run) and non-zero component values following the zero-run is subjected to Huffman coding. One block of image is thus ultimately converted into Huffman-coded data including a Huffman code of a single DC component and (0 or more) subsequent Huffman codes of sets of zero-runs and non-zero AC components. Herein, in this Huffman coding process, if the value 0 appears in one of the frequency components aligned in zigzag scan order (the quantization result) and continues to appear in all of the rest of the frequency components, the high-frequency components including the frequency component and the subsequent frequency components are collectively expressed by a single block end code (referred to as an end of block (FOB) marker), to thereby reduce the data volume.

The Huffman decoding unit 104 sequentially decodes such Huffman codes forming the JPEG-compressed image data. The JPEG code decompressing unit 106 performs inverse quantization or inverse discrete cosine transform (IDCT) on the data resulting from Huffman decoding to calculate the respective pixel values of the pixels in one block (8×8 pixels). The decoding process performed by the Huffman decoding unit 104 and the decompression process performed by the JPEG code decompressing unit 106 may conform to an existing publicly known system.

The block generating unit 108 accumulates in a buffer memory the pixel values of one block (8×8 pixels) as the result of decoding by the JPEG code decompressing unit 106, to thereby generate one block of image data. The respective values of the pixels in the one block generated by the block generating unit 108 are output to the output unit 116 via the output selector 114. The output unit 116 outputs the pixel values to a system serving as an output destination, such as a higher system (an image processing application, for example) that has requested the image data decoding device to perform the decoding process, for example.

In the example in FIG. 1, the output from the Huffman decoding unit 104 is input to the JPEG code decompressing unit 106 not directly but via the background data determining unit 110.

The background data determining unit 110 determines whether or not the result of Huffman decoding on the block output from the Huffman decoding unit 104 represents "background" (i.e., a block in which the DC component is immediately followed by the EOB marker). If the DC component is immediately followed by the EOB marker, only the DC component is present in the block, and thus all of the 8×8 pixels have a uniform value represented by the DC component. Such a block, in which all of the pixels have a uniform value, has no pattern, and thus will be referred to as a "background" block. The background data determining unit 110 supplies the JPEG code decompressing unit 106 with the data of the block determined not to represent the background, and supplies the uniform data block generating unit 112 with the data of the block determined to represent the background.

From the data of one block supplied by the background data determining unit 110 (only the DC component in this case), the uniform data block generating unit 112 generates the data of a block including 8×8 pixels all having the same pixel value corresponding to the DC component, and outputs the generated data to the output selector 114. The pixel values of the one block are output to the output unit 116 via the output selector 114, and then are output to the system as the output destination by the output unit 116.

The output selector 114 receives a background data flag (flag data representing the result of determination of whether or not the block represents the "background") supplied by the background data determining unit 110. If the determination result is "the block does not represent the background," the output selector 114 selects the block generating unit 108. If the determination result is "the block represents the background," the output selector 114 selects the uniform data block generating unit 112. Then, the output selector 114 outputs the pixel values supplied by the selected one of the block generating unit 108 and the uniform data block generating unit 112 to the output unit 116.

Figure 2:
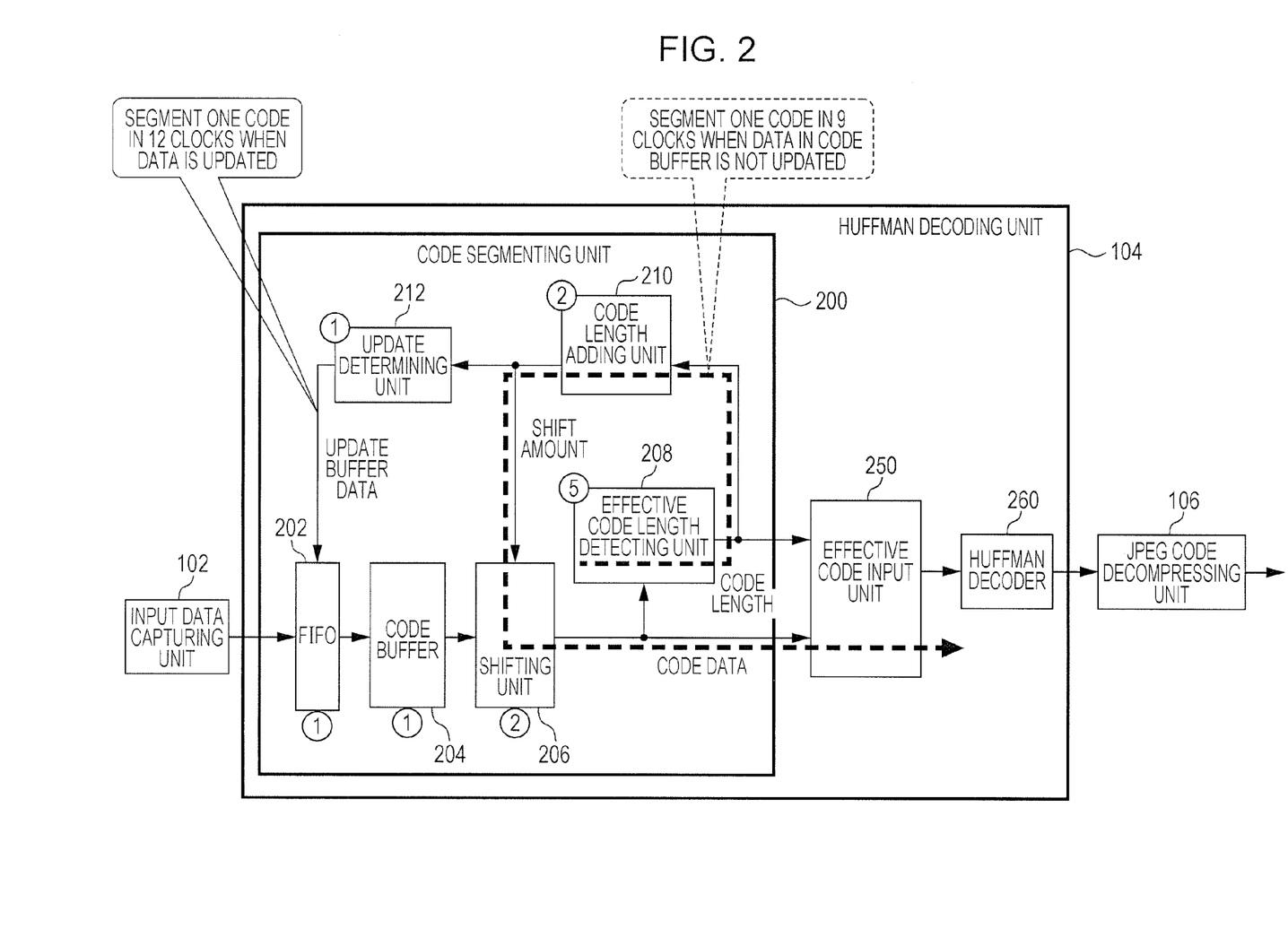
FIG. 2 is a diagram illustrating a configuration example of a Huffman decoding unit in the image data decoding device.

Herein, if the Huffman decoding unit 104 is configured as a logic circuit, it is conceivable to configure the Huffman decoding unit 104 as the circuit illustrated in FIG. 2, for example. The Huffman decoding unit 104 exemplified in FIG. 2 is an example configured with a dynamic reconfigurable processor (DRP). The Huffman decoding unit 104 in FIG. 2 includes a code segmenting unit 200, an effective code input unit 250, and a Huffman decoder 260.

The code segmenting unit 200 segments codes one by one sequentially from the head of the compressed image data captured from the input data capturing unit 102. The effective code input unit 250 inputs the data of effective codes segmented one by one by the code segmenting unit 200 to the Huffman decoder 260. The Huffman decoder 260 decodes the input effective codes in accordance with a system similar to an existing system.

The code segmenting unit 200 includes a first-in, first-out memory (FIFO) 202, a code buffer 204, a shifting unit 206, an effective code length detecting unit 208, a code length adding unit 210, and an update determining unit 212.

The FIFO 202 is a first-in, first-out memory that retains the JPEG-compressed image data captured by the input data capturing unit 102. The data items retained in the FIFO 202 are sequentially extracted from the head of the FIFO 202 and input to the code buffer 204. If a data portion is extracted from the head of the FIFO 202, a JPEG-compressed image data portion equal in amount to the extracted data portion is captured from the input data capturing unit 102 and added to the end of the remaining data in the FIFO 202.

Figure 3:
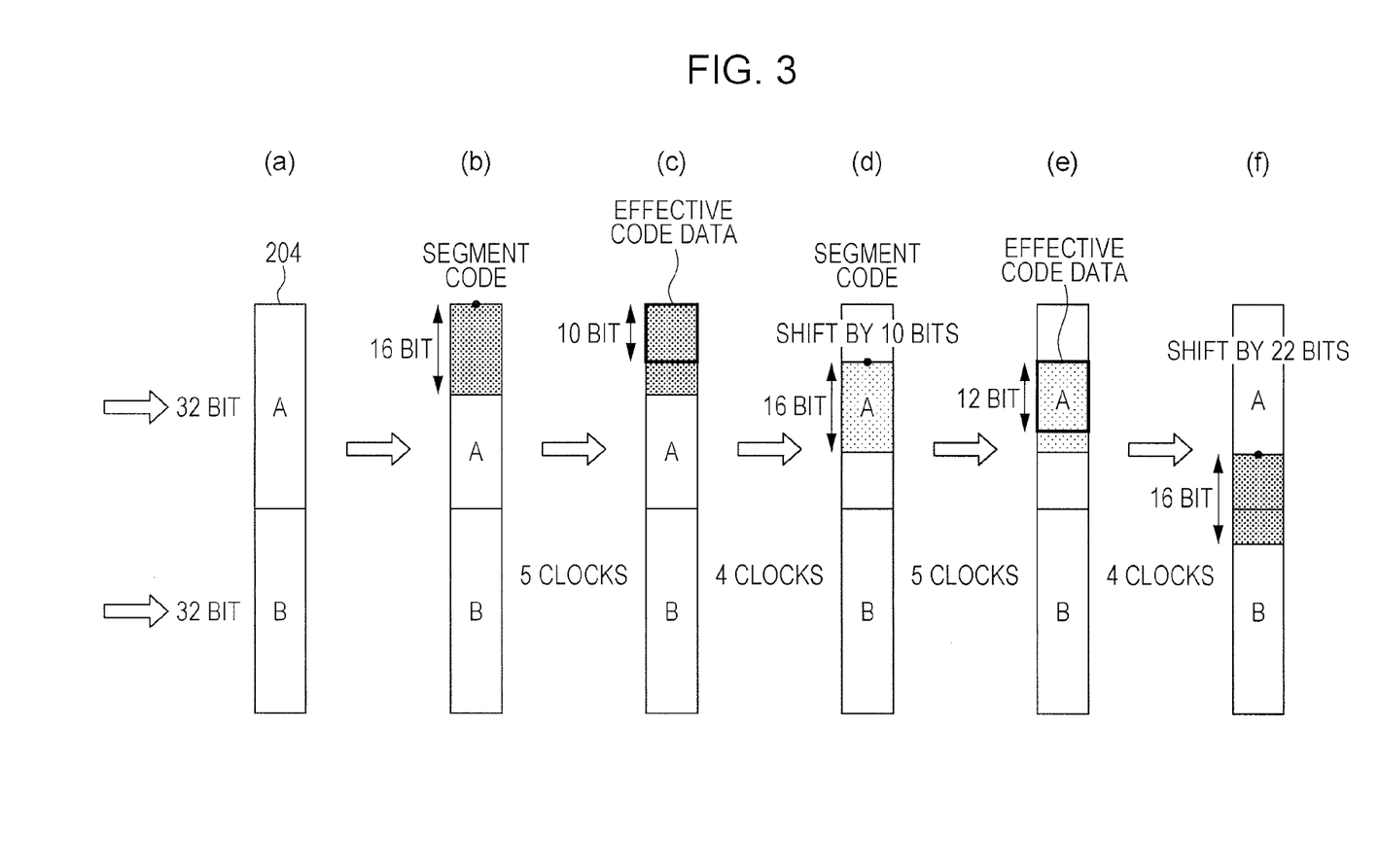
FIG. 3 is a diagram for illustrating a code segmentation process in the Huffman decoding unit.

The code buffer 204 is a buffer that temporarily retains a data string including codes to be segmented. For example, the code buffer 204 may be a buffer that holds two words of 32-bit word data, as illustrated in FIG. 3, in which it is possible to update one word of data at a time.

The shifting unit 206 is a circuit that reads the data string including codes to be segmented from the code buffer 204. The shifting unit 206 shifts the head address of the data to be read from the code buffer 204 in accordance with the code lengths of the effective codes segmented so far. The data string read by the shifting unit 206 is input to the effective code length detecting unit 208 and the effective code input unit 250.

From the data read by the shifting unit 206, the effective code length detecting unit 208 calculates the code length of the effective code included in the data. The effective code length may be determined by a well-known method, such as comparing the read data string with a minimum code value corresponding to an individual code length, for example. The calculated code length is input to the effective code input unit 250 and the code length adding unit 210.

The effective code input unit 250 extracts data having the code length detected by the effective code length detecting unit 208 from the head of the data string input from the shifting unit 206, and inputs the extracted data to the Huffman decoder 260.

The code length adding unit 210 accumulates the code lengths detected by the effective code length detecting unit 208, and inputs the result of accumulation (cumulative sum) to the shifting unit 206 and the update determining unit 212. When the data in the code buffer 204 is updated in accordance with the data input from the FIFO 202, the cumulative sum in the code length adding unit 210 is reset to an initial value. Every time a code is segmented from the head of the code buffer 204, the cumulative sum is increased by the code length of the segmented code.

The cumulative sum is used as a shift amount indicating how many bits from the head of the code buffer 204 precede the head of the next code to which the shifting unit 206 is to shift. That is, in the segmentation of the next code, the shifting unit 206 reads data at an address shifted from the head address of the code buffer 204 by the cumulative sum (shift amount) output by the code length adding unit 210, and supplies the read data to the effective code length detecting unit 208 and so forth.

The update determining unit 212 determines whether or not the data in the code buffer 204 needs to be updated. When the code segmentation starts from the head of the data retained in the code buffer 204 and the code buffer 204 runs out of the data amount required for the code segmentation, the update determining unit 212 instructs the FIFO 202 to output data so as to update the data in the code buffer 204.

A flow of code segmentation performed in the code segmenting unit 200 will be described in detail with reference to FIG. 3. In this example, the code buffer 204 includes two 32-bit buffer areas (A and B). At step (a), two sets of 32-bit data at the head of the compressed image data are first transferred from the FIFO 202 to the code buffer 204. At this point, the shift amount of the shifting unit 206 is 0. At step (b), the shifting unit 206 reads data having a fixed length of 16 bits from the head (a bit position "0") of the code buffer 204, and transmits the read data to the effective code length detecting unit 208. At step (c), the effective code length detecting unit 208 detects how many bits from the head of the transmitted 16-bit data correspond to the effective code (i.e., the effective code length). In the drawing, an initial 10-bit portion of the 16-bit data enclosed by a thick frame corresponds to the effective code. In an example in which the effective code length detecting unit 208 is configured with a group of processor elements (PEs) in the DRP, a time of five clocks is required for this process of detecting the effective code length.

After the effective code length (=10 bits) is detected, the effective code input unit 250 supplies the Huffman decoder 260 with the effective code length of data at the head of the 16-bit data as the code segmentation target supplied by the shifting unit 206. Further, the code length adding unit 210 adds the effective code length "10" detected this time by the effective code length detecting unit 208 to the current value "0" of the shift amount (cumulative sum), and outputs a shift amount "10" as the result of addition. At step (d), in the segmentation of the next code, the shifting unit 206 reads data having a fixed length of 16 bits at a bit position "10" as the head address shifted from the head position "0" of the code buffer 204 by the new shift amount "10," and transmits the read data to the effective code length detecting unit 208. In a circuit configuration example in which the elements in the code segmenting unit 200 are formed of a group of PEs in the DRP, a time of four clocks is required from the detection of the effective code length by the effective code length detecting unit 208 at step (c) to the supply of the 16-bit data as the next code segmentation target to the effective code length detecting unit 208 at step (d).

At step (e), the effective code length detecting unit 208 detects, in a time of five clocks, that the effective code length is 12 bits from the 16-bit data supplied at step (d). The code length adding unit 210 adds the code length "12" detected this time to the current shift amount "10." Accordingly, at step (f), the shifting unit 206 reads data having a fixed length of 16 bits at a bit position shifted from the head position "0" of the code buffer 204 by a new shift amount "22" as the head address, and transmits the read data to the effective code length detecting unit 208.

The above-described process is repeated. Then, if the shift amount output by the code length adding unit 210 exceeds "26," it is no longer possible to extract the 16-bit data as the next code segmentation target from the code buffer 204. If the update determining unit 212 determines that it is thus no longer possible to extract the next 16-bit data from the code buffer 204, the update determining unit 212 reads two 32-bit words from the head of the compressed image data in the FIFO 202, and sequentially stores the two 32-bit words in the buffer areas A and B of the code buffer 204. Further, the update determining unit 212 deletes from the head of the FIFO 202 one of the two words in the FIFO 202 read first, and adds new 32-bit data from the input data capturing unit 102 to the end of the data in the FIFO 202. Accordingly, the data in the code buffer 204 is updated by 32 bits, and the initial 32 bits of the data in the FIFO 202 become equal to the data in the buffer area B of the code buffer 204. Further, in this case, a reset process of subtracting 32 from the cumulative sum (shift amount) held by the code length adding unit 210 is performed. Thereafter, the thus-updated data in the code buffer 204 is repeatedly subjected to a code segmentation process similar to the above-described process.

The description will return to FIG. 2. In FIG. 2, each of circled numbers appearing near blocks representing the elements in the code segmenting unit 200 represents the number of clocks required for the corresponding element to execute the processing thereof. For example, the shifting unit 206 requires a time of two clocks to extract the fixed-length data string to be subjected to the code segmentation process from the code buffer 204 in accordance with the shift amount and transmit the extracted data string to the effective code length detecting unit 208. The effective code length detecting unit 208 requires a time of five clocks to execute the process of segmenting a code from the data string supplied by the shifting unit 206.

A path indicated by a thick broken line in FIG. 2 is a processing path (pipeline) for the segmentation of one code during a time in which the update of the code buffer 204 by the update determining unit 212 is not performed. On this processing path, two clocks are first required for the shifting unit 206 to extract the segmentation target data from the code buffer 204 in accordance with the shift amount, and five clocks are further required for the effective code length detecting unit 208 to detect the effective code length from the data. Furthermore, two clocks are required for the code length adding unit 210 to update the shift amount indicating the next code segmentation position. With these times added up, it is understood that a total time of nine clocks is required to segment one code during the time in which the update of the code buffer 204 is not performed.

Further, when the update of the code buffer 204 is performed, a time of one clock required for the processing of the update determining unit 212, a time of one clock required for the transfer of the data for the update from the FIFO 202 to the code buffer 204, and a time of one clock required for the update of the code buffer 204 with the transferred data, i.e., a total extra time of three clocks is required. When the update of the code buffer 204 is performed, therefore, a time of twelve clocks is required to segment one code.

As described above, the Huffman decoding unit 104 requires a time of at least nine clocks to segment one code. Also in the case of the code representing a background image block formed only of a DC component, a time of at least nine clocks is required to segment the code and detect that the code indicates a DC component followed by a block end code.

Meanwhile, in the device configuration illustrated in FIG. 1, the uniform data block generating unit 112 is capable of generating and outputting one block (64 pixels) of image data at a time at high speed, if the block is a background block formed only of a DC component. Even if the uniform data block generating unit 112 is capable of generating and outputting one block of image data in a time less than nine clocks (four clocks, for example), however, the Huffman decoding of the input data as the basis of the processing of the uniform data block generating unit 112 requires at least nine clocks. Even though the uniform data block generating unit 112 is capable of high-speed processing, therefore, the effect thereof is offset. That is, the code segmenting unit 200 is a bottleneck in the overall processing speed of the image data decoding device.

Figure 4:
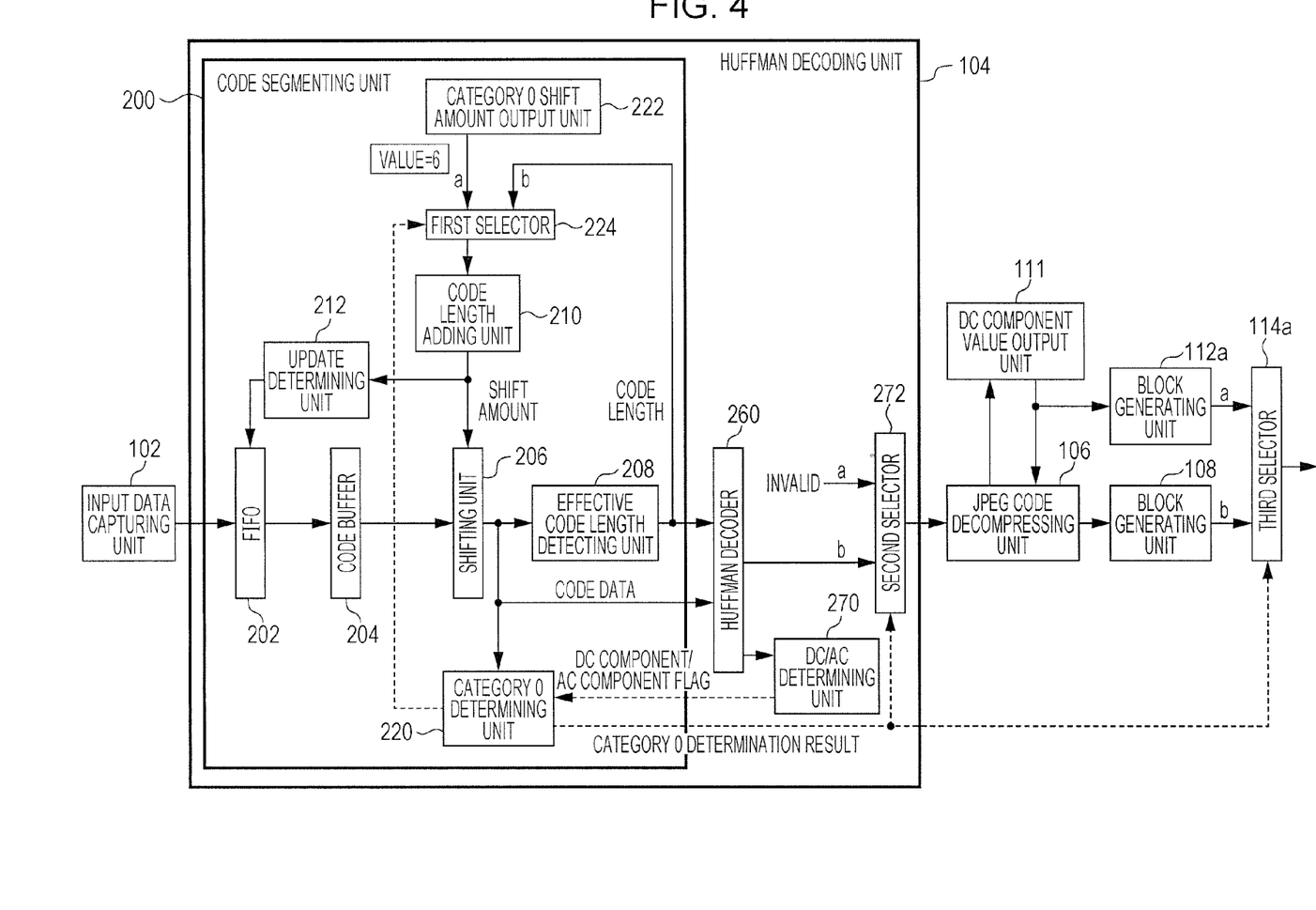
FIG. 4 is a diagram illustrating a configuration of major components of the image data decoding device according to the exemplary embodiment.

To address the above-described issue, the present exemplary embodiment increases the speed of code segmentation of a block not including an AC component but including only a DC component (a background block) and corresponding to category 0, to thereby exploit the high-speed performance of the circuit that outputs the data of such a background image block. FIG. 4 illustrates an example of the circuit configuration of the image data decoding device according to the present exemplary embodiment.

As is well known, in the coding of the DC component according to JPEG, the difference value of the DC component of the block concerned from the DC component of the immediately preceding block (referred to as the DC difference value) is calculated, and the DC difference value is subjected to Huffman coding. In the Huffman coding, the DC difference value is categorized in accordance with the size of the absolute value thereof, and each category is assigned with a Huffman code. Category 0 is a category corresponding to a DC difference value of 0 and indicating that the DC component of the block concerned is the same as the DC component of the immediately preceding block. The Huffman code assigned to a DC component in category 0 is "00."

The Huffman code representing a block not including an AC component but including only a DC component and corresponding to category 0, i.e., a background block in category 0, is a 6-bit code "001010" in which the Huffman code "00" representing a DC component in category 0 is immediately followed by a block end code (FOB marker) "1010."

According to an analysis by the inventors of J11 chart, which is a color presentation pattern with many charts, graphs, figures, and images included in test patterns for printers (JEITA IT-3011) specified by Japan Electronics and Information Technology Industries Association (JEITA), 95% of blocks including only DC components (background blocks) in the chart fall in category 0. It is considered that background blocks in category 0 account for a substantially large proportion also in documents created with word processors or spreadsheet software often used in offices, catalogs, brochures, general books, and so forth.

In the present exemplary embodiment, the code segmenting unit 200 includes a special circuit (a category 0 determining unit 220) that determines whether or not a Huffman code represents a background block in category 0. If the circuit detects a background block in category 0, a signal for notifying the detection of a background block in category 0 is transmitted to a later-stage selector for selecting output data (a third selector 114a, which corresponds to the output selector 114 in the example in FIG. 1) via a bypass not routing thought the effective code length detecting unit 208.

The circuit configuration illustrated in FIG. 4 will be described below. The Huffman decoding unit 104 illustrated in FIG. 4 corresponds to the circuit configuration of the Huffman decoding unit 104 illustrated in FIG. 2 added with the category 0 determining unit 220, a category 0 shift amount output unit 222, a first selector 224, a DC/AC determining unit 270, and a second selector 272.

The category 0 determining unit 220 receives the 16-bit data as the code segmentation target input from the shifting unit 206, which is the same as the 16-bit data supplied to the effective code length detecting unit 208. The category 0 determining unit 220 determines whether or not the initial 6 bits of the 16-bit data input from the shifting unit 206 represent a background block in category 0. If a condition (a) that the pattern of the initial 6 bits of the input 16-bit data is "001010" and a condition (b) that the 6 bits represent a DC component are both satisfied, the category 0 determining unit 220 determines that the pattern of the 6 bits represents a background block in category 0. The determination on the condition (b) of the above-described conditions is made also in consideration of a determination result signal supplied by the DC/AC determining unit 270.

If the DC/AC determining unit 270 detects a shift to the end of one block from the output from the Huffman decoder 260, the DC/AC determining unit 270 determines that the next code indicates a DC component, and supplies a flag value indicating the DC component to the category 0 determining unit 220. The shift to the end of one block may be detected on the basis of the detection of the block end code. Further, if the DC/AC determining unit 270 detects that the codes of 63 AC components including zero-runs have been output from the Huffman decoder 260 after the detection of a DC component at the head of a block, the DC/AC determining unit 270 also determines the shift to the end of one block.

Further, if the DC/AC determining unit 270 detects that the code of the DC component has been output from the Huffman decoder 260, the DC/AC determining unit 270 determines that the next code indicates an AC component, and supplies a flag value indicating the AC component to the category 0 determining unit 220.

If the flag supplied by the DC/AC determining unit 270 indicates the DC component, and if the initial 6 bits of the 16-bit data input from the shifting unit 206 match the pattern "001010," the category 0 determining unit 220 determines that the data of the 6 bits represents a background block in category 0. Further, if the category 0 determining unit 220 determines that the initial 6 bits of the data input from the shifting unit 206 represent a background block in category 0, the category 0 determining unit 220 determines the data input next from the shifting unit 206 to be a DC component, irrespective of the value of the flag supplied by the DC/AC determining unit 270 (in consideration of the possibility that the DC/AC determination may not finish before the processing of the next code owing to a delay of the effective code length detecting unit 208 or the like).

Whether or not the determination target data is a DC component is thus taken into account in the determination of the category 0 determining unit 220, since some Huffman codes indicating AC components have an initial portion matching the pattern "001010."

If the initial 6 bits of the input 16-bit data do not match the pattern "001010," or if it has been found from the flag supplied by the DC/AC determining unit 270, for example, that the input data is not a DC component, the category 0 determining unit 220 makes a negative determination (i.e., a determination that the data does not represent "a background block in category 0").

A signal representing the determination result of the category 0 determining unit 220 is supplied to the first selector 224, the second selector 272, and the third selector 114a. The first selector 224, the second selector 272, and the third selector 114a receive two inputs, i.e., Input a and Input b. The first selector 224, the second selector 272, and the third selector 114a select Input a if the signal received from the category 0 determining unit 220 has a value indicating "a background block in category 0," and selects Input b if the signal does not have the value.

The output from the category 0 shift amount output unit 222 is supplied as Input a to the first selector 224, and the output from the effective code length detecting unit 208 is supplied as Input b to the first selector 224. The first selector 224 selects and outputs one of the two inputs to the code length adding unit 210. The category 0 shift amount output unit 222 constantly outputs a fixed value "6" corresponding to the bit length of the Huffman code pattern "001010" representing a background block in category 0.

If the category 0 determining unit 220 makes a positive determination (i.e., the code segmented this time represents a background block in category 0), therefore, the first selector 224 supplies the value "6" to the code length adding unit 210. Thereby, the shift amount output by the code length adding unit 210 is increased by the bit length "6" of the Huffman code pattern "001010" representing a background block in category 0. In this case, the addition of the shift amount takes place before the completion of the detection process of the effective code length detecting unit 208 (the time required for the process is five clocks, for example), allowing the shifting unit 206 to read the next segmentation target data. The update determination of the update determining unit 212 is similarly executed before the completion of the process of the effective code length detecting unit 208.

Conversely, if the determination result of the category 0 determining unit 220 is negative (the segmented code does not represent a background block in category 0), the first selector 224 selects Input b. Thereby, the output value of the effective code length detecting unit 208 is supplied to the code length adding unit 210. Therefore, the effective code length calculated by the effective code length detecting unit 208 is input to the code length adding unit 210 upon lapse of the time required for the detection process of the effective code length detecting unit 208 (five clocks, for example) after the reading of the data from the code buffer 204 by the shifting unit 206. This operation is similar to that of the circuit configuration illustrated in FIG. 2.

The second selector 272 will now be described. A signal value indicating "invalid" is supplied as Input a to the second selector 272, and the output from the Huffman decoder 260 is supplied as Input b to the second selector 272. The second selector 272 selects and outputs one of the two inputs to the JPEG code decompressing unit 106.

If the category 0 determining unit 220 makes the positive determination, the second selector 272 selects and outputs Input a indicating "valid" to the JPEG code decompressing unit 106. The JPEG code decompressing unit 106 may temporarily stop the decompression process upon detection of the value indicating "invalid." With the decompression process temporarily stopped in accordance with the input of the value indicating "invalid," erroneously segmented data is reliably prevented from being decompressed and transmitted to a later stage.

That is, if Input a to the second selector 272 is selected, the segmented code represents a background block in category 0. In this case, one block of uniform background values is output at a time from a block generating unit 112a (corresponding to the uniform data block generating unit 112 in the example in FIG. 1) instead of the use of the JPEG code decompressing unit 106. Therefore, the third selector 114a selects Input a from the block generating unit 112a. In this case, in addition to the selection of Input a, the JPEG code decompressing unit 106 is temporarily stopped to prevent a decompression result of unnecessary data from being output from the JPEG code decompressing unit 106 and erroneously transmitted to a later stage.

If the category 0 determining unit 220 makes the negative determination, the second selector 272 selects Input b, and outputs the decoding result of the Huffman decoder 260 to the JPEG code decompressing unit 106. The JPEG code decompressing unit 106 performs JPEG decompression on the decoding result, to thereby decode one block of image data. This process is similar to that of the circuit configuration illustrated in FIG. 2.

The third selector 114a will now be described. The output from the block generating unit 112a is supplied as Input a to the third selector 114a, and the output from the block generating unit 108 is supplied as Input b to the third selector 114a. The third selector 114a selects and outputs one of the two inputs to an external device (to a decoding requesting device via the output unit 116 in the example in FIG. 1).

The block generating unit 108 generates and outputs one block of image data on the basis of the decompression result of the JPEG code decompressing unit 106, similarly to the block generating unit 108 illustrated in FIG. 1.

Meanwhile, the block generating unit 112a generates and outputs one block (i.e., 64 pixels) of background image data, in which all of the pixels have a DC component value supplied by a DC component value output unit 111. The DC component value output unit 111 retains and constantly outputs the latest DC component value output from the JPEG code decompressing unit 106 (in other words, the DC component value of the immediately preceding block). The DC component value is also supplied to the JPEG code decompressing unit 106. In the decompression and decoding of the DC component, the JPEG code decompressing unit 106 adds the DC difference value of the decoding result to the DC component value of the immediately preceding block, to thereby calculate the DC component value of the current block. Thus, a pair of the DC component value output unit 111 and the block generating unit 112a corresponds to the uniform data block generating unit 112 in the example in FIG. 1.

If the category 0 determining unit 220 makes the positive determination, the third selector 114a selects and outputs Input a, i.e., the image data of the background block output by the block generating unit 112a, to the external device.

If the category 0 determining unit 220 makes the negative determination, the third selector 114a selects Input b, and outputs the image data of the normal JPEG decompression result output from the block generating unit 108. This process is similar to that of the circuit configuration illustrated in FIG. 2.

Among the first selector 224, the second selector 272, and the third selector 114a described above, the first selector 224 immediately switches the selection upon determination of the category 0 determining unit 220 in accordance with the determination result. Meanwhile, each of the second selector 272 and the third selector 114a switches the selection after data present on the pipeline of the circuit from the shifting unit 206 to the corresponding one of the second selector 272 and the third selector 114a at the time of the determination has been processed.

That is, the second selector 272 switches the selection from Input b (for normal JPEG decompression) to Input a (for high-speed output of background blocks in category 0) when the Huffman decoder 260 has processed all of the data present on a pipeline formed of the effective code length detecting unit 208 and the Huffman decoder 260 between the shifting unit 206 and the second selector 272. The length of the pipeline (a pipeline delay amount) is known. If the second selector 272 receives the signal representing the positive determination (the code represents a background block in category 0) from the category 0 determining unit 220 when Input b is selected, the second selector 272 switches the selection to Input a after standing by for the number of clocks corresponding to the pipeline delay amount. Alternatively, for example, the Huffman decoder 260 may output, in parallel with the decoding result, a token indicating whether or not the decoding result corresponds to the end of the block to the second selector 272, to thereby control the switching of the second selector 272 in accordance with the token. In this example, if the second selector 272 receives the positive determination from the category 0 determining unit 220 when Input b is selected, the second selector 272 does not switch to Input a until the token indicating the end of the block is input. Upon input of the token indicating the end of the block, the second selector 272 switches the selection to Input a.

Similarly, the third selector 114a switches from Input b to Input a when the third selector 114a has output all data present on the pipeline between the shifting unit 206 and the third selector 114a (the effective code length detecting unit 208, the Huffman decoder 260, the JPEG code decompressing unit 106, and the block generating unit 108) to the external device. From another perspective, the switching takes place at a time after the second selector 272 switches the selection from Input b to Input a, at which the codes of the block being decompressed by the JPEG code decompressing unit 106 at the time of the switch of the second selector 272 have been decompressed, and the data of the block resulting from the decompression has been output from the third selector 114a. The above-described time is detected with, for example, the token output in parallel with the data output to the JPEG code decompressing unit 106 by the second selector 272. That is, the second selector 272 transmits the token, which indicates whether or not the data output to the JPEG code decompressing unit 106 corresponds to the end of the block, to the third selector 114a together with the data via a signal path in parallel with the pipeline after the JPEG code decompressing unit 106. If the third selector 114a receives the positive determination from the category 0 determining unit 220 when Input b is selected, the third selector 114a does not switch to Input a until the token indicating the end of the block is input. Upon input of the token indicating the end of the block, the third selector 114a switches the selection to Input a.

The above description has been given of the time of switching the selection of the second selector 272 from Input b to Input a and the time of switching the selection of the third selector 114a from Input b to Input a. Similarly, in the case of switching the selection of the second selector 272 and the third selector 114a in the inverse direction (i.e., from Input a to Input b), the block generating unit 112a is outputting the data of the preceding block (a background block in category 0) at the moment at which the category 0 determining unit 220 switches the determination result from the positive determination (the code represents a background block in category 0) to the negative determination (the code does not represent a background block in category 0). Therefore, the third selector 114a switches the selection to Input b after all of the data in the block has been output.

The image data decoding device illustrated in FIG. 4 starts decoding the input compressed image data after the selection of each of the first selector 224, the second selector 272, and the third selector 114a is initialized to Input b. Thereafter, the selection of the first selector 224, the second selector 272, and the third selector 114a is switched in accordance with the above-described system with the progress of the decoding. Accordingly, as to a block not being a background block in category 0, the image data decoding device outputs the decompression result of the JPEG code decompressing unit 106. As to a background block in category 0, the image data decoding device outputs one block of data the same as the DC component of the immediately preceding block. Herein, if the code representing a background block in category 0 consecutively appears in the input compressed image data, the first selector 224 supplies the shift amount "6 for category 0 to the code length adding unit 210 immediately (i.e., not via the processing of the effective code length detecting unit 208) in accordance with the determination result of the category 0 determining unit 220. Therefore, the time required for the code segmenting unit 200 to segment one code (the length of the pipeline) is shorter than in the normal case illustrated in FIG. 2 by the processing time of the effective code length detecting unit 208 (five clocks, for example). The minimum segmentation time per code is nine clocks in the example in FIG. 2, whereas the circuit configuration in FIG. 4 is capable of segmenting one code in a minimum time of four clocks in a portion in which the code representing a background block in category 0 consecutively appears. If 64 pixels of image data of a background block are output in four clocks, for example, from the block generating unit 112a, therefore, the code segmentation speed of the code segmenting unit 200 is equivalent to the speed of outputting the image data from the block generating unit 112a. With such a mechanism, the image data decoding device as a whole attains high-speed decoding processing without ruining the high-speed output performance of the block generating unit 112a that outputs the background block data.

The above description has been given of an exemplary embodiment of the present invention.

As described above, the Huffman code representing a background block in category 0 is the 6-bit data string "001010," while the code segmentation target data read from the code buffer 204 by the shifting unit 206 has the 16-bit length. In the segmentation target data, therefore, the G-bit code representing a background block in category 0 may appear twice consecutively. In consideration that many images include a continuation of background of the same color, it is assumed that the 6-bit code representing a background block in category 0 often appears twice consecutively in the 16 bits as the segmentation target.

As a modified example of the circuit in FIG. 4, therefore, the category 0 determining unit 220 may determine whether or not there is a sequence of two background blocks in category 0. That is, the category 0 determining unit 220 may determine whether or not the initial 12 bits of the 16-bit data supplied by the shifting unit 206 match a pattern "001010001010" in which the code "001010" appears twice consecutively. If the result of the determination is positive ("match"), and if the flag indicating the DC component is input from the DC/AC determining unit 270 (or the determination result of the immediately preceding code is also "match"), the category 0 determining unit 220 supplies the value representing the positive determination to the first selector 224, the second selector 272, and the third selector 114a. Accordingly, the third selector 114a selects Input a, i.e., the output from the block generating unit 112a (if Input b is selected, the third selector 114a selects Input a after the data not output at the time of the positive determination has been output), and outputs two blocks of background block data from the block generating unit 112a (in a time of eight clocks, if four clocks are required to output one block). Conversely, if the category 0 determining unit 220 makes a negative determination (i.e., no sequence of two background blocks in category 0) when Input a is selected by the third selector 114a, the third selector 114a switches the selection to Input b after the background blocks (the sequence of two background blocks) being output at the time of the determination have been output.

In this modified example, the category 0 shift amount output unit 222 outputs a shift amount "12" corresponding to two appearances of the code "001010."

In this modified example, if the pipeline delay due to the processing of the code length adding unit 210 and the pipeline delay due to the processing of the shifting unit 206 are each two clocks similarly as in the case of FIG. 2, it is possible to output two background blocks in category 0 en bloc in a time of four clocks corresponding to one cycle of code segmentation (if the update of the code buffer 204 is not performed). That is, it is possible to attain a code segmentation speed approximately twice the code segmentation speed of the above-described exemplary embodiment that detects and outputs the background blocks in category 0 one by one. If this modified example is configured such that the block generating unit 112*a* outputs two blocks of data (with an output bus doubled in bandwidth, for example) in a time in which the code segmenting unit 200 detects a sequence of two background blocks in category 0 (four clocks in the above-described example), the code segmenting unit 200 and the block generating unit 112*a* match in speed, causing no loss.

In this modified example, the data read from the code buffer 204 by the shifting unit 206 has 16 bits, and the code representing a background block in category 0 (referred to as the "category 0 background code") has 6 bits. Therefore, the category 0 determining unit 220 determines whether or not the code appears twice consecutively. Meanwhile, if the data read from the code buffer 204 by the shifting unit 206 has 32 bits, for example, it is possible to detect a pattern in which the category 0 background code consecutively appears five times at most, and thus to consecutively output five background blocks. The number of consecutive appearances of the category 0 background code detected at the same time by the category 0 determining unit 220 may be determined not to exceed the possible maximum number of appearances of the category 0 background code in the bit length of data read from the code buffer 204 by the shifting unit 206. In this case, the number of consecutive appearances of the category 0 background code may be determined within an allowable range of the output bandwidth (output speed) of the output bus used to output the image data of the background blocks generated by the block generating unit 112*a* to the external device.

Description will now be given of an example in which the image data decoding device according to the exemplary embodiment is mounted on a DRP. As well known, a DRP is a processor capable of dynamically reconfiguring an internal logic circuit configuration thereof by dynamically (i.e., in one clock, for example) changing the combination of PEs to be used and the wiring structure of the PEs. The circuit configuration configured on the DRP is called a configuration (hereinafter abbreviated as "config"). The DRP is capable of retaining plural config data items for defining the configuration, and reconfigures the internal circuit configuration thereof by changing the config data to be used.

In the following example of mounting on a DRP, a normal JPEG decoding system and a decoding system for the background blocks in category 0 will be treated as separate configurations.

Figure 5:
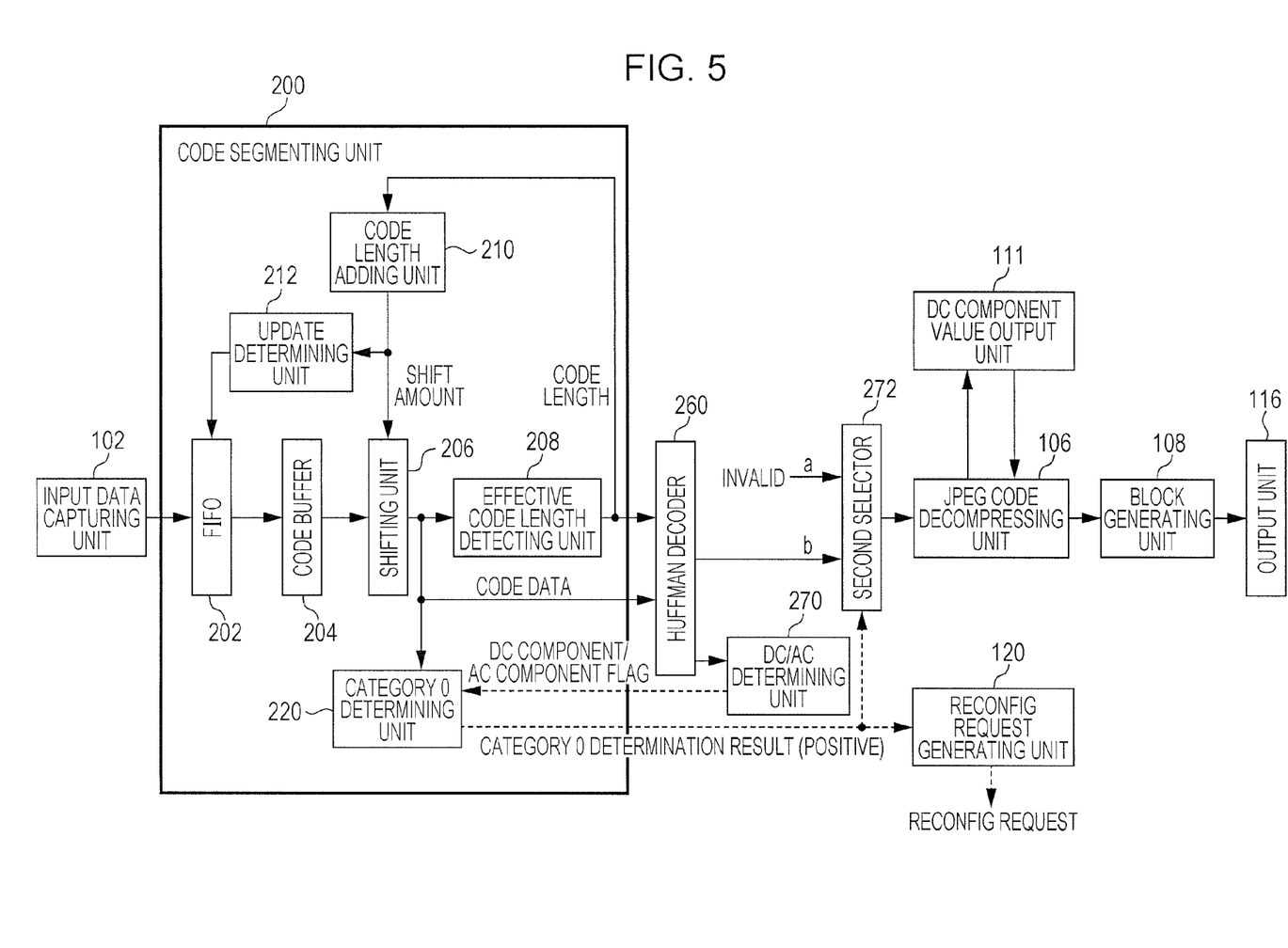
FIG. 5 is a diagram illustrating an example of a configuration (config) for performing normal JPEG decompression, which is one of two configurations divided from the image data decoding device according to the exemplary embodiment to be mounted on a dynamic reconfigurable processor (DRP)

The normal JPEG decoding system is mounted as Config A illustrated in FIG. 5. Constituent elements of Config A illustrated in FIG. 5 similar to those of the image data decoding device according to the above-described exemplary embodiment illustrated in FIG. 4 are designated by the same reference numerals.

As illustrated in FIG. 5, Config A corresponds to the circuit configuration illustrated in FIG. 4 with the category 0 shift amount output unit 222, the first selector 224, the block generating unit 112*a*, and the third selector 114*a* removed therefrom and a reconfig request generating unit 120 newly added thereto. The elements removed from the configuration illustrated in FIG. 4 are unnecessary for the normal JPEG decoding.

Config A is configured on the DRP during a time in which the determination of the category 0 determining unit 220 is that the head of the data string received from the shifting unit 206 does not correspond to "the code representing a background block in category 0" (negative determination). During this time, Input b is selected by the second selector 272, and code segmentation and decoding similar to those described with reference to FIG. 2 are performed.

Then, if the category 0 determining unit 220 determines that the head of the data string received from the shifting unit 206 corresponds to "the code representing a background block in category 0" (positive determination) when Config A is configured on the DRP, the second selector 272 switches the selection to Input a. At the same time, the reconfig request generating unit 120 having received the signal representing the positive determination generates a reconfiguration (re-config) request requesting for a switch to Config B for the background blocks in category 0, and outputs the generated request to a reconfig controller 1008 (later described; see FIG. 7). Thereby, the circuit configured on the DRP is reconfigured into Config B described next (see FIG. 6).

If the reconfig request generating unit 120 receives the signal representing the positive determination from the category 0 determining unit 220, the reconfig request generating unit 120 issues the reconfig request after unprocessed data present on the pipeline from the shifting unit 206 to the output unit 116 at the time of the determination has been processed.

Figure 6:
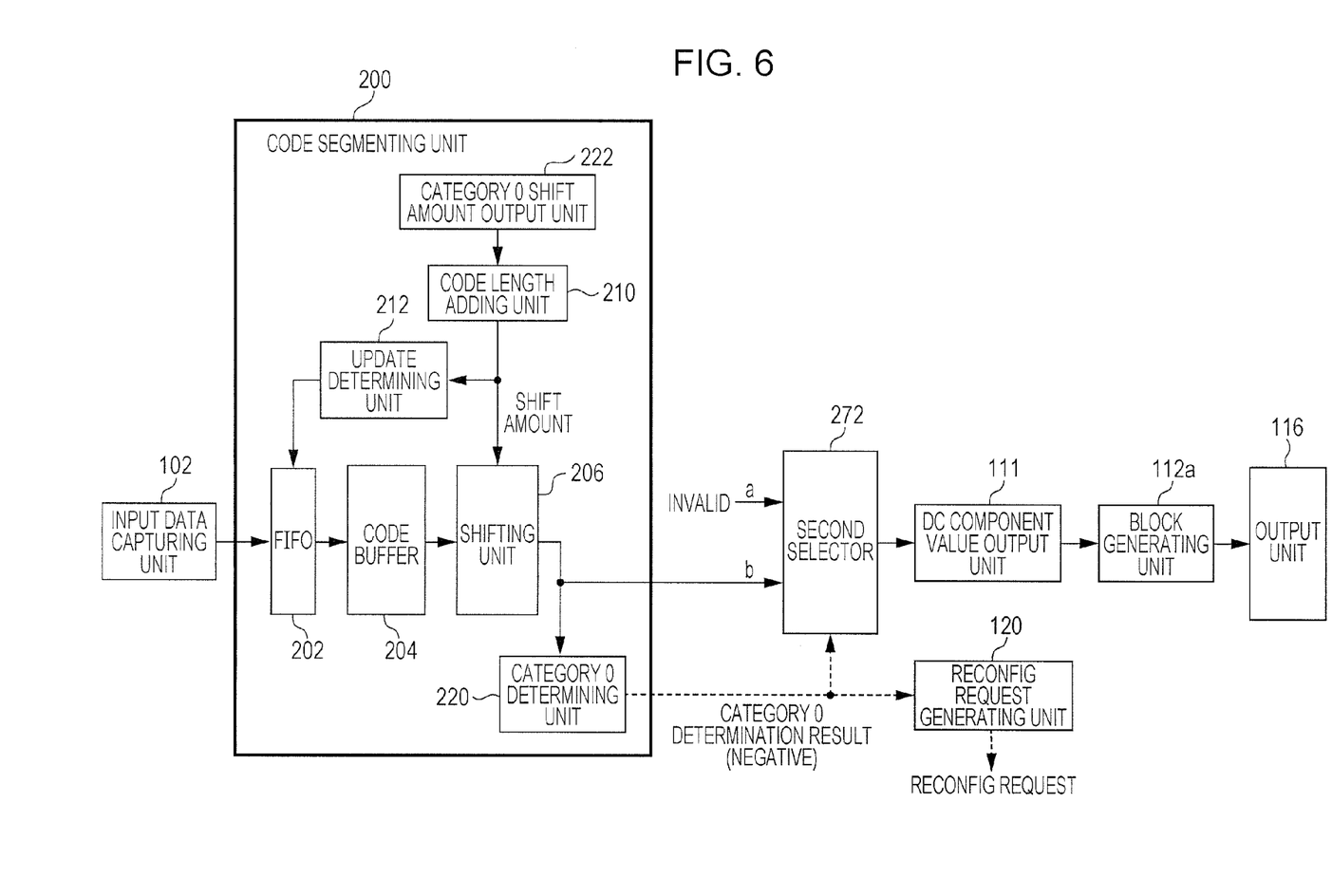
FIG. 6 is a diagram illustrating an example of a configuration (config) for performing decompression only on background blocks in category 0, which one of the two configurations divided from the image data decoding device according to the exemplary embodiment to be mounted on a DRP.

As illustrated in FIG. 6, Config B corresponds to the circuit configuration illustrated in FIG. 4 with the JPEG code decompressing unit 106, the block generating unit 108, the effective code length detecting unit 208, the first selector 224, the Huffman decoder 260, the DC/AC determining unit 270, and the third selector 114*a* removed therefrom and the reconfig request generating unit 120 newly added thereto. The elements removed from the configuration illustrated in FIG. 4 are unnecessary for decoding the background blocks in category 0.

The circuit configuration on the DRP is Config B during a time in which the determination of the category 0 determining unit 220 is that the head of the data string received from the shifting unit 206 corresponds to "the code representing a background block in category 0" (positive determination). During this time, Input b is selected by the second selector 272, and a signal for operating the DC component value output unit 111 is output by the second selector 272. The DC component value output unit 111 retains the latest DC component value calculated by the JPEG code decompressing unit 106 in the circuit of Config A (FIG. 5) before the switch to Config B. The DC component value output unit 111 outputs the DC component value to the block generating unit 112*a* during the time in which the DC component value output unit 111 receives the signal of Input b from the second selector 272. Accordingly, the block generating unit 112*a* outputs the data of the pixels of the background block each having the DC component value to the external device via the output unit 116.

Then, if the category 0 determining unit 220 determines that the head of the data string received from the shifting unit 206 does not correspond to "the code representing a background block in category 0" (negative determination) when Config B is configured on the DRP, the second selector 272 switches the selection to Input a. Thereby, the signal indicating "invalid" is input to the DC component value output unit 111. Upon receipt of the signal indicating "invalid," the DC component value output unit 111 stops outputting the DC component value retained therein (or outputs the signal indicating "invalid" in place of the DC component value). At the same time, the reconfig request generating unit 120 having received a signal representing the negative determination generates a reconfig request requesting for a switch to Config A, and outputs the generated request to the later-described reconfig controller 1008. Thereby, the circuit configured on the DRP is reconfigured into Config A (see FIG. 5).

If the reconfig request generating unit 120 of Config B receives the signal representing the negative determination from the category 0 determining unit 220, the reconfig request generating unit 120 issues the reconfig request after the data of all of the pixels in the block corresponding to the DC component value already output from the DC component value output unit 111 at the time of the determination has been output from the block generating unit 112a via the output unit 116, similarly as in the exemplary embodiment in FIG. 4.

If the employed DRP is partially reconfigurable, elements shared by Config A and Config B may be left on the DRP to reconfigure only elements not shared by Config A and Config B in the switch (reconfiguration) from Config A to Config B and vice versa. Partial reconfiguration refers to a process of leaving parts of the circuit configured on the DRP and reconfiguring the remaining parts into another configuration. For example, when Config A in FIG. 5 is partially reconfigured into Config B in FIG. 6, the input data capturing unit 102, the FIFO 202, the code buffer 204, the shifting unit 206, the code length adding unit 210, the update determining unit 212, the category 0 determining unit 220, the second selector 272, the DC component value output unit 111, the output unit 116, and the reconfig request generating unit 120 of Config A are stored intact. Then, the category 0 shift amount output unit 222 and the block generating unit 112a as the elements newly required in Config B and wiring for connecting these elements with other existing elements are formed with processor elements (PEs) in the DRP other than the PEs forming the stored elements.

The circuit elements stored before and after the partial reconfiguration restart the processing thereof after the reconfiguration, with the data retained in the circuit elements before the reconfiguration still retained therein. For example, in reconfiguration from Config A to Config B and vice versa, the code length adding unit 210 remains with a pre-reconfiguration cumulative sum (shift amount) retained therein, and restarts the processing thereof with the retained cumulative sum.

In the examples illustrated in FIGS. 5 and 6, the category 0 determining unit 220 may determine whether or not there is a sequence of two background blocks in category 0. In this case, the category 0 shift amount output unit 222 outputs the shift amount "12" corresponding to two appearances of the code representing a background block in category 0.

Figure 7:
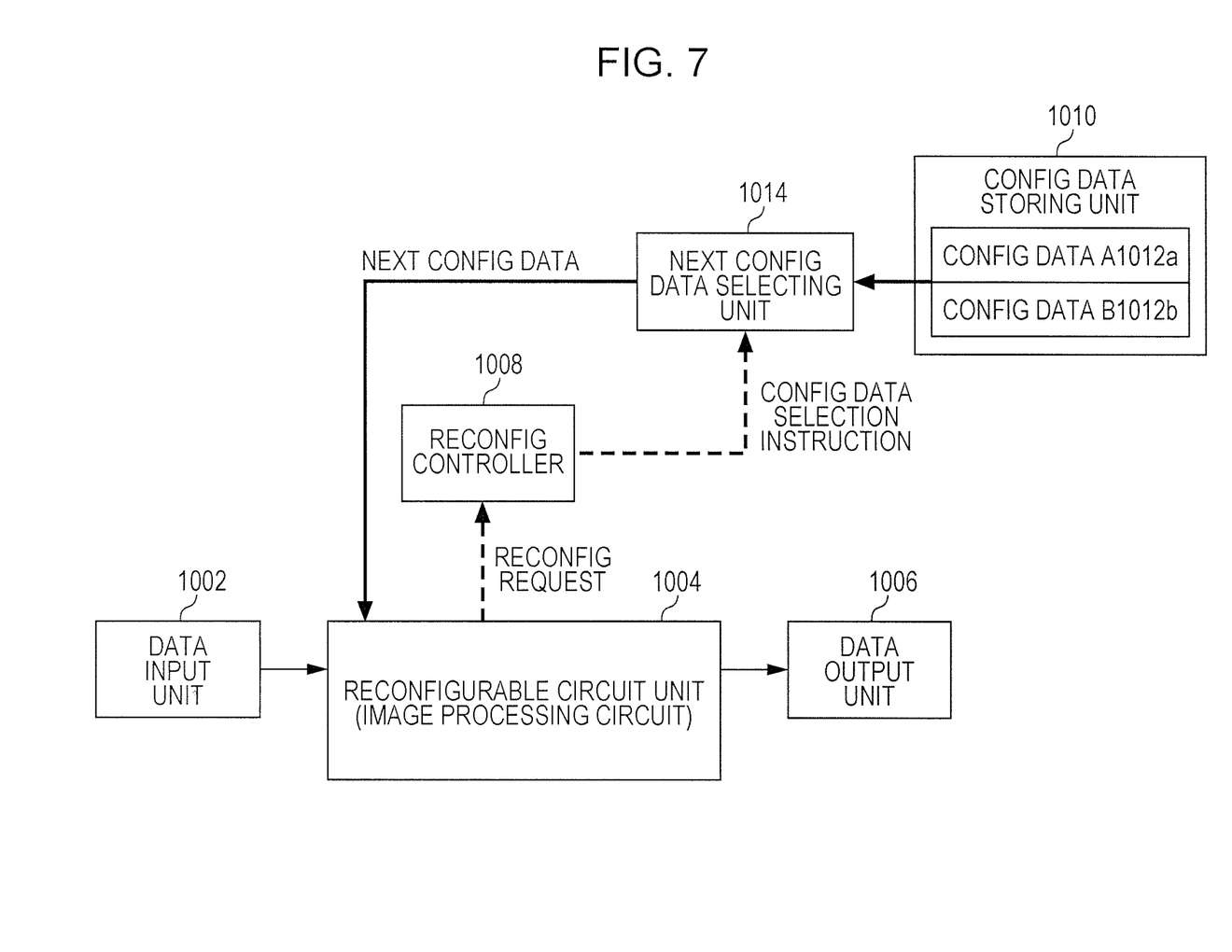
FIG. 7 is a diagram illustrating an example of a system configuration in which the image data decoding device according to the exemplary embodiment is mounted on a DRP.

FIG. 7 illustrates an example of the DRP configuration for realizing such a config switching function.

In the DRP illustrated in FIG. 7, a reconfigurable circuit unit 1004 is a circuit capable of reconfiguring an internal logic circuit configuration thereof dynamically (i.e., during the operation of the processor). For example, the DNA is an array formed of multiple processor elements (PEs) and capable of rearranging the connection configuration of the PEs at high speed (in one clock, for example) in accordance with the configuration data. If the architecture of a digital application processor (DAP) DNA introduced in the publication is employed in the present exemplary embodiment, the reconfig controller 1008 and a next config data selecting unit 1014 are realized by the execution of a program representing later-described functions by a general-purpose processor core called DAP. In this case, a circuit including the reconfigurable circuit unit 1004 and the general-purpose processor core is provided as a single DRP. Further, the DRP includes a memory such as a random access memory (RAM) and an input/output circuit for inputting and outputting data to and from an external device. Of course, some of these hardware elements may be integrated on a single integrated circuit. This is, of course, a mere example, and another reconfigurable processor architecture may be employed.

A data input unit 1002 is a unit that supplies input data to a processing circuit reconfigured on the reconfigurable circuit unit 1004. For example, a buffer area for the input data secured in a memory connected to the reconfigurable circuit unit 1004 is an example of the data input unit 1002. In this case, when a host system (a central processing unit (CPU) of a computer installed with the DRP according to the present exemplary embodiment, for example) causes the DRP to execute the process of decoding a compressed image, the host system transfers, as the input data, the compressed image data to be processed to a buffer area, and instructs the reconfig controller 1008 to process the input data. In accordance with the instruction, the reconfig controller 1008 supplies the input data from the data input unit 1002 to an image data decoding circuit configured on the reconfigurable circuit unit 1004. Further, as another example, the data may be transferred from the host system to the DRP according to the present exemplary embodiment by direct memory access (DMA). In this case, the data input unit 1002 corresponds to a channel assigned by a DMA controller (illustration omitted) in a data processor, for example.

A data output unit 1006 is a unit that outputs the data output from the image data decoding circuit reconfigured on the reconfigurable circuit unit 1004 to the host system. Similarly to the above-described data input unit 1002, an output buffer secured in the memory connected to the reconfigurable circuit unit 1004 or an output channel assigned by the DMA controller is a specific example of the data output unit 1006.

The reconfig controller 1008 controls the connection of the circuit elements in the reconfigurable circuit unit 1004, to thereby reconfigure the circuit on the reconfigurable circuit unit 1004 to perform various data processing. Further, the reconfig controller 1008 performs a control of supplying the input data to the circuit reconfigured on the reconfigurable circuit unit 1004 via the data input unit 1002 or returning the output data from the circuit to the host system via the data output unit 1006 in accordance with an instruction from the host system.

The circuit in the reconfigurable circuit unit 1004 is reconfigured in accordance with config data stored in a config data storing unit 1010. In this example, the config data storing unit 1010 stores config data A1012a and config data B1012b representing Config A illustrated in FIG. 5 and Config B illustrated in FIG. 6, respectively. The config data storing unit 1010 is configured in a storage device, such as a RAM in the DRP or a nonvolatile memory, for example. It is possible to add new config data to the config data storing unit 1010 or delete existing config data from the config data storing unit 1010 under the control of the host system.

If the reconfig controller 1008 receives a reconfig request from the circuit configured on the reconfigurable circuit unit 1004, the reconfig controller 1008 issues an instruction to select config data according to the request to the next config data selecting unit 1014.

The next config data selecting unit 1014 is a unit that selects config data specifying a config into which the circuit on the reconfigurable circuit unit 1004 is to be reconfigured next. For example, control information representing respective conditions for applying config data items stored in the config data storing unit 1010 to the reconfigurable circuit unit 1004 is previously set in the next config data selecting unit 1014 by the host system. If the next config data selecting unit 1014 receives an instruction from the reconfig controller 1008, the next config data selecting unit 1014 reads config data according to the instruction from the config data storing unit 1010 in accordance with the control information. After the processing of the config currently configured on the reconfigurable circuit unit 1004 is completed, the next config data selecting unit 1014 writes the config data on the reconfigurable circuit unit 1004, to thereby switch the reconfigurable circuit unit 1004 to the next circuit configuration.

As in the above-described architecture of DAPDNA, the reconfigurable circuit unit 1004 may be provided with a config memory including plural banks to store config data items in the respective banks and sequentially change the bank to be used, to thereby reconfigure the circuit. For example, if a larger number of config data items than the number of banks in the config memory are used, the config data items in the banks may sequentially be overwritten with the config data items in the config data storing unit 1010.

When decoding starts in such a DRP configuration, Config A is first configured in the reconfigurable circuit unit 1004. Then, if a reconfig request arrives from the reconfig request generating unit 120 of Config A, the reconfig controller 1008 rewrites the circuit in the reconfigurable circuit unit 1004 into Config B. Further, if a reconfig request arrives from the reconfig request generating unit 120 of Config B, the reconfig controller 1008 rewrites the circuit in the reconfigurable circuit unit 1004 into Config A. Thereby, functions equivalent to those of the device in FIG. 4 are realized by switching between Config A and Config B.

The above description has been given of an exemplary embodiment and a modified example thereof. In the above-described examples, the image data decoding device according to the exemplary embodiment or the modified example thereof is mounted on a DRP. However, the configuration in FIG. 4 not requiring the reconfiguration of the circuit is also mountable in various forms of circuits other than the DRP, such as normal integrated circuits including an integrated circuit (IC), a large-scale integrated circuit (LSI), and an application specific integrated circuit (ASIC), and programmable logic circuits including a field programmable gate array (FPGA).

The above description has been given of an example using JPEG as an image data compression system. The system of the present exemplary embodiment, however, is not limited to JPEG, and is applicable to compression and coding systems in general that handle compressed image data in which each of the blocks includes the information of one DC component and the information of frequency components other than the DC component, and any of the blocks in which the frequency components other than the DC component all have the value 0 only includes the information of the DC component and the block end code. Herein, the DC component is not necessarily limited to a component having a frequency of exactly 0, and may be a lowest frequency component obtained by frequency analysis in the compression and coding system. Further, the method employed in the frequency analysis is not limited to DCT employed in JPEG, and may be another method such as wavelet transform.

The above-described image data decoding device may be incorporated in an apparatus having a function of decoding compressed data of a still image, such as a copier, a printer, a combined machine (a multifunction machine combining the functions of a printer, a scanner, a copier, a facsimile machine, and so forth), or a digital camera.

Further, the above description has been given of an example in which elements such as the effective code length detecting unit 208 are configured as a hardware circuit. Also in a case in which elements such as the effective code length detecting unit 208 are configured as software with program modules, if the detection process of the effective code length detecting unit 208 requires a longer time than the time taken for the output of one block of data from the block generating unit 112a, an issue similar to that of the device described with reference to FIGS. 1 and 2 will arise. This issue would be well addressed by a principle similar to that of the device according to the exemplary embodiment illustrated in FIG. 4 and so forth, if the category 0 determining unit 220 capable of performing faster determination than the effective code length detecting unit 208 is mounted as software. The effective code length detecting unit 208 needs to determine which one of different code lengths matches the data supplied by the shifting unit 206, whereas the category 0 determining unit 220 only needs to determine whether or not the supplied data matches a single specific code pattern (the foregoing pattern "001010," for example). Also in the case in which the category 0 determining unit 220 is configured as software, therefore, the category 0 determining unit 220 is capable of performing faster processing than the effective code length detecting unit 208. The image data decoding device according to the exemplary embodiment or the modified example mounted as software is thus capable of obtaining similar effects to those of the image data decoding device mounted as a hardware circuit.

The image data decoding device according to the exemplary embodiment or the modified example mounted as software is realized by causing a general-purpose computer to execute a program representing the processes of the respective functional modules of the device. The computer in this case includes, as hardware, a circuit configuration in which a microprocessor such as a CPU, memories (primary storages) such as a random access memory (RAM) and a read only memory (ROM), a secondary storage controller for controlling secondary storages such as a hard disk drive (HDD), a solid state drive (SSD), and a flash memory, various input/output (I/O) interfaces, and a network interface for controlling connection with a wireless or wired network, for example, are connected via a bus, for example. The bus may be connected, via an I/O interface, for example, to a disk drive for reading and/or writing data to and from portable disk recording media such as a compact disc (CD), a digital versatile disc (DVD), and a Blu-ray disc, or to a memory reader/writer for reading and/or writing data to and from portable nonvolatile recording media of various standards, such as a flash memory. The program having the processing contents of the above-exemplified functional modules described thereon is stored in a secondary storage device such as a flash memory via a recording medium such as a CD or a DVD or via a communication unit such as a network, and then is installed in the computer. The program stored in the secondary storage device is read in the RAM and executed by the microprocessor such as a CPU, to thereby realize the above-exemplified functional module group.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data decompressing device comprising at least one hardware processor configured to implement:
   an effective code length detector that detects an effective code length of an initial portion of compressed image data to be decompressed, and supplies the detected effective code length to a Huffman decoder to allow a decompressing unit to decompress data having the effective code length from a head of the compressed image data; and
   a determining unit that determines whether or not the initial portion of the compressed image data to be decompressed corresponds to a specific pattern in which a code representing a specific direct-current difference value is followed by a block end code, and if having determined that the initial portion of the compressed image data to be decompressed corresponds to the specific pattern, notifies the decompressing unit of the detection of the specific pattern without waiting for the detection of the effective code length by the effective code length detector, to allow the decompressing unit to output a predetermined decompression result corresponding to the specific direct-current difference value.

2. The data decompressing device according to claim 1, further comprising:
   a reconfigurable circuit,
   wherein the at least one hardware processor is further configured to implement a reconfiguration controller that controls reconfiguration of a first circuit configuration and a second circuit configuration on the reconfigurable circuit,
   wherein the first circuit configuration includes
      a circuit forming the determining unit,
      a circuit forming the effective code length detector,
      a circuit that, if the circuit forming the determining unit determines that the initial portion of the compressed image data to be decompressed does not correspond to the specific pattern, decompresses the data having the effective code length detected by the effective code length detector from the head of the compressed image data by using a decompression system according to a compression system for the compressed image data, and
      a circuit that, if the circuit forming the determining unit determines that the initial portion of the compressed image data to be decompressed corresponds to the specific pattern, requests the reconfiguration controller to reconfigure the first circuit configuration into the second circuit configuration, and
   wherein the second circuit configuration includes
      a circuit forming the determining unit,
      a circuit that, if the circuit forming the determining unit determines that the initial portion of the compressed image data to be decompressed corresponds to the specific pattern, outputs the predetermined decompression result corresponding to the specific direct-current difference value, and
      a circuit that, if the circuit forming the determining unit determines that the initial portion of the compressed image data to be decompressed does not correspond to the specific pattern, requests the reconfiguration controller to reconfigure the second circuit configuration into the first circuit configuration.

3. The data decompressing device according to claim 1, wherein the code representing the specific direct-current difference value is a category 0 code indicating that a difference between a direct-current component of a block concerned and a direct-current component of a block immediately preceding the block concerned is 0.

4. The data decompressing device according to claim 3, further comprising:
   a reconfigurable circuit,
   wherein the at least one hardware processor is further configured to implement a reconfiguration controller that controls reconfiguration of a first circuit configuration and a second circuit configuration on the reconfigurable circuit,
   wherein the first circuit configuration includes
      a circuit forming the determining unit,
      a circuit forming the effective code length detector,
      a circuit that, if the circuit forming the determining unit determines that the initial portion of the compressed image data to be decompressed does not correspond to the specific pattern, decompresses the data having the effective code length detected by the effective code length detector from the head of the compressed image data by using a decompression system according to a compression system for the compressed image data, and
      a circuit that, if the circuit forming the determining unit determines that the initial portion of the compressed image data to be decompressed corresponds to the specific pattern, requests the reconfiguration controller to reconfigure the first circuit configuration into the second circuit configuration, and
   wherein the second circuit configuration includes
      a circuit forming the determining unit,
      a circuit that, if the circuit forming the determining unit determines that the initial portion of the compressed image data to be decompressed corresponds to the specific pattern, outputs the predetermined decompression result corresponding to the specific direct-current difference value, and
      a circuit that, if the circuit forming the determining unit determines that the initial portion of the compressed image data to be decompressed does not correspond to the specific pattern, requests the reconfiguration controller to reconfigure the second circuit configuration into the first circuit configuration.

5. The data decompressing device according to claim 3, wherein the determining unit determines whether or not the initial portion of the compressed image data to be decompressed corresponds to a pattern in which the specific pattern consecutively appears a predetermined number of times, and
   wherein, if the determining unit determines that the initial portion of the compressed image data to be decompressed corresponds to the pattern in which the specific pattern consecutively appears the predetermined number of times, the determining unit allows the decompressing unit to consecutively output the predetermined decompression result corresponding to the specific direct-current difference value the predetermined number of times.

6. The data decompressing device according to claim 5, further comprising:
a reconfigurable circuit,
wherein the at least one hardware processor is further configured to implement a reconfiguration controller that controls reconfiguration of a first circuit configuration and a second circuit configuration on the reconfigurable circuit,
wherein the first circuit configuration includes
a circuit forming the determining unit,
a circuit forming the effective code length detector,
a circuit that, if the circuit forming the determining unit determines that the initial portion of the compressed image data to be decompressed does not correspond to the specific pattern, decompresses the data having the effective code length detected by the effective code length detector from the head of the compressed image data by using a decompression system according to a compression system for the compressed image data, and
a circuit that, if the circuit forming the determining unit determines that the initial portion of the compressed image data to be decompressed corresponds to the specific pattern, requests the reconfiguration controller to reconfigure the first circuit configuration into the second circuit configuration, and
wherein the second circuit configuration includes
a circuit forming the determining unit,
a circuit that, if the circuit forming the determining unit determines that the initial portion of the compressed image data to be decompressed corresponds to the pattern in which the specific pattern consecutively appears the predetermined number of times, outputs the predetermined decompression result corresponding to the specific direct-current difference value the predetermined number of times, and
a circuit that, if the circuit forming the determining unit determines that the initial portion of the compressed image data to be decompressed does not correspond to the pattern in which the specific pattern consecutively appears the predetermined number of times, requests the reconfiguration controller to reconfigure the second circuit configuration into the first circuit configuration.

7. The data decompressing device according to claim 1, wherein:
the at least one hardware processor is further configured to implement a DC/AC determining unit that detects a shift to an end of one block from an output of the Huffman decoder; and
the determining unit notifies the decompressing unit of the detection of the specific pattern without waiting for the detection of the effective code length by the effective code length detector, in response to having determined that the initial portion of the compressed image data to be decompressed corresponds to the specific pattern, and in response to the DC/AC determining unit detecting the shift to the end of the block from the output of the Huffman decoder.

8. The data decompressing device according to claim 7, wherein the determining unit does not notify the decompressing unit of the detection of the specific pattern, in response to the DC/AC determining unit not detecting the shift to the end of the block from the output of the Huffman decoder.

9. A non-transitory computer readable medium storing a program causing a computer to execute a process for data decompression, the process comprising:
detecting an effective code length of an initial portion of compressed image data to be decompressed, and supplying the detected effective code length to a Huffman decoder to allow a decompressing unit to decompress data having the effective code length from a head of the compressed image data; and
determining whether or not the initial portion of the compressed image data to be decompressed corresponds to a specific pattern in which a code representing a specific direct-current difference value is followed by a block end code, and if having determined that the initial portion of the compressed image data to be decompressed corresponds to the specific pattern, notifying the decompressing unit of the detection of the specific pattern without waiting for the detection of the effective code length, to allow the decompressing unit to output a predetermined decompression result corresponding to the specific direct-current difference value.

10. A data decompressing device comprising at least one hardware processor configured to implement:
a detector that detects an effective code length of an initial portion of compressed data to be decompressed and supplies the detected effective code length to a Huffman decoder; and
an output unit that, if an initial portion of the compressed data to be decompressed corresponds to a specific pattern in which a code representing a specific direct-current difference value is followed by a block end code, outputs a predetermined decompression result corresponding to the specific direct-current difference value without waiting for the detection of the effective code length by the detector.

* * * * *